(12) United States Patent
Stacey et al.

(10) Patent No.: US 7,020,141 B1
(45) Date of Patent: Mar. 28, 2006

(54) ATM COMMON PART SUB-LAYER DEVICE AND METHOD

(75) Inventors: Dave J Stacey, Stanstead Abbotts (GB); Simon Brueckheimer, London (GB); Fai Tsang, South Woodham Ferrers (GB)

(73) Assignee: Nortel Networks Limited, St. Laurent (CA)

( * ) Notice: Subject to any disclaimer, the term of this patent is extended or adjusted under 35 U.S.C. 154(b) by 541 days.

(21) Appl. No.: 09/416,679

(22) Filed: Oct. 12, 1999

(51) Int. Cl.
*H04L 12/28* (2006.01)

(52) U.S. Cl. .......................... 370/395.21; 370/395.42; 370/395.64; 370/411

(58) Field of Classification Search ............ 370/394, 370/395.1, 395.2, 395.21, 395.4, 395.42, 370/395.6, 395.64, 395.7, 395.71, 411, 412, 370/413, 395.61–395.65
See application file for complete search history.

(56) References Cited

U.S. PATENT DOCUMENTS

| | | | | |
|---|---|---|---|---|
| 5,463,620 A | * | 10/1995 | Sriram | ........................ 370/412 |
| 5,499,238 A | * | 3/1996 | Shon | ........................ 370/399 |
| 5,526,345 A | * | 6/1996 | Wallmeier | ................ 370/395.4 |
| 5,625,625 A | * | 4/1997 | Oskouy et al. | ........... 370/395.4 |
| 5,946,309 A | * | 8/1999 | Westberg et al. | ......... 370/395.3 |
| 5,949,791 A | * | 9/1999 | Byers et al. | ................ 370/466 |
| 6,195,353 B1 | * | 2/2001 | Westberg | ................. 370/230.1 |
| 6,490,298 B1 | * | 12/2002 | Chin et al. | ................... 370/532 |

* cited by examiner

*Primary Examiner*—John Pezzlo
*Assistant Examiner*—Dmitry Levitan
(74) *Attorney, Agent, or Firm*—Barnes & Thornburg LLP

(57) ABSTRACT

A common part sublayer (CPS) ATM adaptation device provides an interface between a narrow band network and a broad band network. The adaptation device is functionally partitioned to provide scheduling, prioritization and multiplexing of ingress traffic to the broadband network independently of the adaptation layer (AAL) type of that traffic. The device incorporating ingress and egress paths respectively to and from the broadband network. The egress path provides segregation and delineation of incoming data units on to respective external data ports, and the ingress path incorporates a common memory for payload storage whereby to perform multiplexing at both AAL and ATM layers.

14 Claims, 11 Drawing Sheets

ATM COMMON PART SUB-LAYER DEVICE AND METHOD

FIELD OF THE INVENTION

This invention relates to arrangement and method of adapting voice and data traffic into an ATM network.

BACKGROUND OF THE INVENTION

The services that are carried in today's telecommunications network can be categorised into two main types; real time and non-real time services. The key examples of these two types are respectively voice telephony and computer data. The two services have very different characteristics and requirements and therefore have traditionally been carried over disjoint network technologies. However to increase flexibility and to decrease costs, there is a major drive by PTTs and network operators to integrate real-time and non-real time services within one homogeneous network. The asynchronous transfer mode (ATM) has been specifically designed to enable this.

A key component of ATM is the adaptation function. This provides the mechanism that adapts the carried service to and from the ATM domain. Several adaptation layers have so far been defined. For example, ATM Adaptation Layer 1 (AAL1) is designed to adapt constant bit rate services (predominately voice or video) into fixed length ATM cells. A key feature of AAL1 is that it enables the timing relationship between the transmitter and receiver to be maintained over the asynchronous network. In contrast, AAL5 has been predominantly designed to support data services. As such it provides a mechanism to segment long data packets into fixed length ATM cells and a mechanism to enable the integrity of the reassembled data packet to be validated after transmission across the network. AAL5 is also being used in certain applications to carry voice services (particularly in computer desktop applications) where AAL5 technology is readily available.

Both AAL1 and AAL5 adapt the carried service into a stream of fixed length ATM cell payloads. However for certain compressed voice services the length of the ATM cell payload (48 bytes) is too large and its use would lead to a large packetisation delay that in turn would affect existing network delay budgets and acceptable voice characteristics. To resolve this problem AAL2 has been defined. AAL2 supports a multiplex of user channels within a single Virtual Channel Connection (VCC). Each user channel is carried in a stream of 'mini-packets'—the length of the mini-packet payload for each channel can be defined according to the packetisation delay that can be tolerated. AAL2 differs from AAL1 and AAL5 in two key ways; firstly it enables a single VCC to support multiple diverse services (a number of simultaneous voice, video and data channels can be multiplexed together to reduce packetisation delay), and secondly it introduces a new switching layer above the ATM layer (i.e. the function of switching a mini-packet connection from one AAL2 VCC to another AAL2 VCC).

To support the full range of telecommunication services operators need to provide these three adaptation layers in an efficient manner. There also needs to be a mechanism to enable the interworking between services carried over different adaptation layers (for example to enable a PSTN user carried via AAL1 to communicate with a desktop voice user whose computer only supports AAL5). To increase flexibility further and to scale networks there is also a requirement to support AAL2 switching.

There is a general need to provide a functional partitioning of an adaptation layer technology that enables these interworking requirements to be met with the flexibility to carry a call in any of the AALs. Further, a partitioning is required that enables a number of usable adaptation technology layer modes to be configured from the set of basic building blocks—these modes include trunking between the ATM domain and the legacy carrier domain; interworking between ATM connections (either using the same or a differing adaptation layer) and switching (AAL2). It is desirable that this partitioning is scalable such that a range of adaptation capacities can be configured to match the transmission interfaces of the SDH using the set of basic adaptation building blocks. A key requirement of any adaptation layer partitioning is such that it optimises buffering apportionment in order to minimise the delay through any system and to minimise the memory and hence cost requirements of any implementation.

SUMMARY OF THE INVENTION

An object of the invention is to provide an improved arrangement and method for providing functional partitioning of an ATM adaptation layer.

According to a first aspect of the invention there is provided a common part sublayer (CPS) adaptation device, said device being functionally partitioned to provide scheduling and prioritization of ingress traffic independently of the adaptation layer (AAL) type of that traffic.

According to another aspect of the invention, there is provided a common part sublayer (CPS) ATM adaptation device, for interfacing between a narrow band network and a broad band network said device being functionally partitioned to provide scheduling, prioritization and multiplexing of ingress traffic to the broadband network independently of the adaptation layer (AAL) type of that traffic, and incorporating ingress and egress paths respectively to and from the broadband network, wherein said egress path provides segregation and delineation of incoming data units on to respective external data ports, and wherein said ingress path incorporates a common memory for payload storage whereby to perform multiplexing at both AAL and ATM layers.

According to a further aspect of the invention, there is provided a method of interfacing a narrow band network and a broadband network via a common part sublayer (CPS) ATM adaptation device, the method comprising; in an ingress direction towards the broadband network, providing scheduling, prioritization and multiplexing of ingress traffic to the broadband network independently of the adaptation layer (AAL) type of that traffic, and, in an egress direction from the broadband network, providing on a through path segregation and delineation of incoming data units According to another aspect of the invention, there is provided a communications network arrangement, comprising a narrow band network, a broadband network, and a common part sublayer (CPS) ATM adaptation device providing an interfacing function therebetween, wherein common part sublayer ATM adaptation device is functionally partitioned to provide scheduling, prioritization and multiplexing of ingress traffic to the broadband network independently of the adaptation layer (AAL) type of that traffic, and incorporates ingress and egress paths respectively to and from the broadband network, wherein said egress path provides segregation and delineation of incoming data units on to respective external data ports, and wherein said ingress path incorporates a common memory for payload storage whereby to perform multiplexing at both AAL and ATM layers.

Advantageously, the egress path operates in a flow-through mode so as to minimize delays.

The functional partitioning and architecture of the CPS device can be optimised for an adaptation layer technology partitioning The functional partitioning and architecture of the CPS device that enables the device to be optimally configured together with suitable SSCS devices to provide ATM and IP trunking and interworking functions. Alternatively the CPS device can be configured without SSCS devices to provide an AAL2 and ATM switching capability.

The partitioning can further provide the functions of AAL2 packet multiplexing and demultiplexing and ATM layer multiplexing and demultiplexing for all AALs.

The partitioning can enable the egress traffic (received by the CPS from the ATM network) to flow-through the CPS without recourse to buffering. Such flow-through operation minimises the delay through the system and lowers the complexity of the CPS device.

Advantageously a common shared memory architecture is provided for data in the ingress direction. The partitioning enables the memory to act as the primary buffer storage for data in the ingress direction thus minimising overall system delays, potential for blocking, signal flow complexity, and dynamic buffering for all the ingress traffic irrespective of the operational mode including AAL-2 switching and maximises the scheduling flexibility.

In a further embodiment, a number of CPS devices can be cascaded by the use of multiple links to increase bandwidth and connection capacity.

Advantageously the CPS device incorporates a dynamic SDU buffer architecture that provides flexible QoS controls for all AAL types and ATM applications.

The CPS partitioning enables the flexible scheduling capabilities and priorities for all ingress traffic irrespective of the AAL types. In particular, the partitioning enables priority scheduling to be performed independently at both the AAL2 multiplexing layer and the ATM cell layers. Priority can be applied according to both connection identifier and/or state of a connection's traffic type.

In a further embodiment, the functional partitioning of the CPS device can be performed via its operating software.

A full range of traffic congestion monitoring and traffic congestion avoidance mechanisms can be supported. Such mechanisms can operate at both the (AAL2) adaptation layer and the ATM layer. The partitioning can be modified to support other transport layers (e.g. MPEG2-TS), and to enable AAL2 packets to be transported over non-ATM transport structures.

BRIEF DESCRIPTION OF THE DRAWINGS

Embodiments of the invention will now be described with reference to the accompanying drawings in which:—

FIG. 1, which is introduced for comparative and explanatory purposes, illustrates a known functional partitioning to implement a particular ATM adaptation layer technology. In this configuration, the adaptation layer technology functionality is partitioned into a number of key devices: a Service Specific Convergence Sublayer (SSCS) Voice Device that provides service layer functions to assemble (and disassemble) delay sensitive traffic (e.g. voice channels) into AAL1 or AAL5 ATM Service Data Units (SDUs) or into AAL2 mini-channel SDUs; a Service Specific Convergence Sublayer (SSCS) Data Device that provides service layer functions to assemble (and disassemble) non-delay critical traffic (e.g. IP data packets) into either AAL5 ATM SDUs or AAL2 mini-channel SDUs; an optional Queue Manager Device that can be used to increase the amount of cell delay variation (CDV) and packet delay variation (PDV) compensation that the system can provide and additionally can be used to increase the traffic shaping and scheduling capability of the system; and a Common Part Sublayer (CPS) device that performs the functions of ATM header and AAL2 minichannel header assembly (and disassembly) together with the function of multiplexing (and de-multiplexing) the stream of AAL2 layer and ATM layer connections together onto a single physical interface. The arrangement then supports all of the features of the key ATM adaptation layers (AAL1, AAL2 and AAL5).

Those skilled in the art will appreciate that such a partitioning separates the key functions of the system such that the divergent requirements of voice and data applications can be provided in specialised devices that are unencumbered with the orthogonal functionality necessary to support the other service yet through the use of a common CPS layer still retains the ability to multiplex voice and data services together onto the same physical ATM link and (for AAL2) within the same VCC connection. Those skilled in the art will further recognise that the multiplexing and demultiplexing functionality provided by the CPS is the base functionality needed to provide the ability to perform AAL2 switching capability. Thus the partitioning enables an AAL2 switching function to be optimally configured in either isolation (simply through the use of CPS devices) or in combination (using both CPS and SSCS devices). A further key advantage of the partitioning is the ability to extend the CDV and PDV compensation provided by the SSCS device through the use of the optional Queue Manager device—this enables the system to be used in environments where a high level of jitter may be introduced on the connection (typically in low speed access applications) but without encumbering the SSCS device unduly. (In the majority of applications where the PDV/CDV is less, the CDP/PDV compensation capability of the SSCS is sufficient to prevent the need to deploy a Queue Manager).

Figure 1:
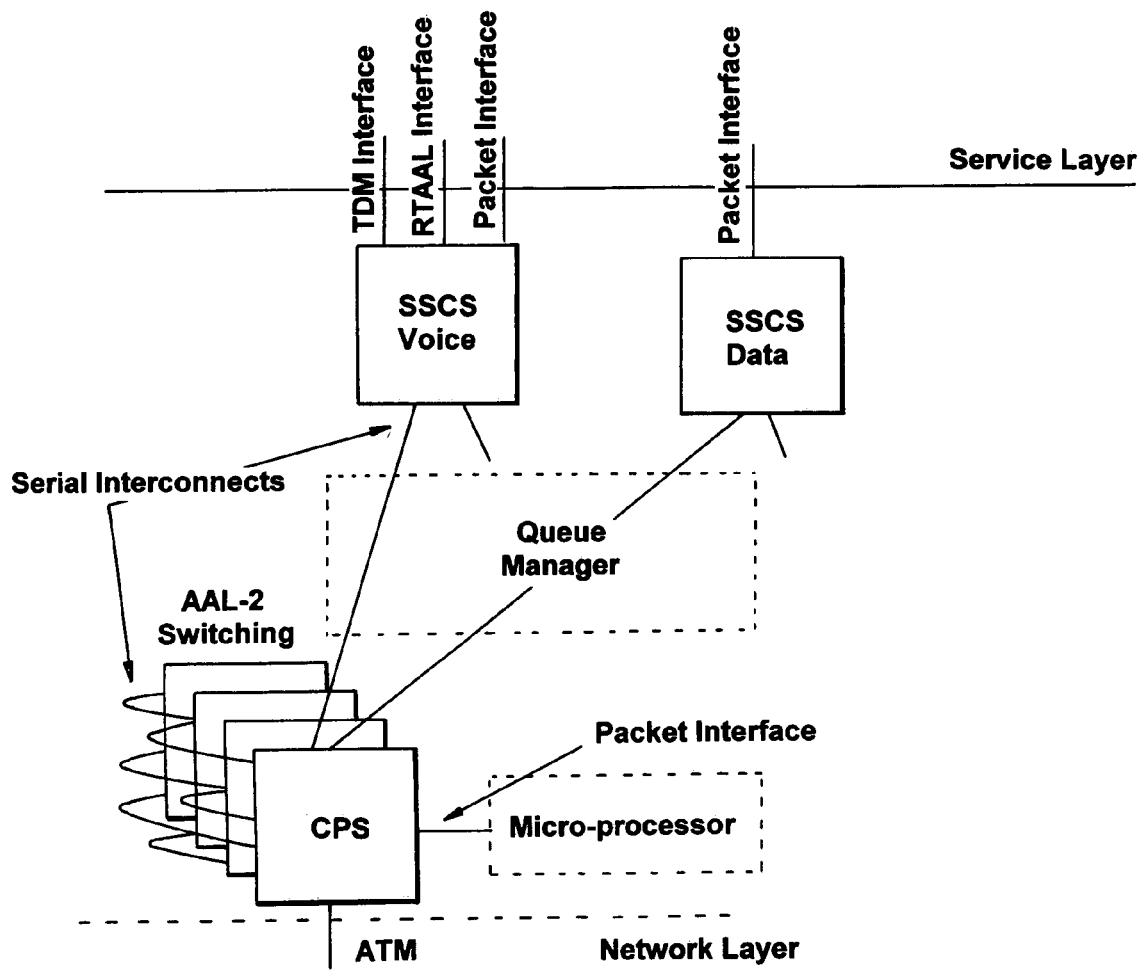
FIG. 1 shows a prior art adaptation layer technology functional partitioning.
Figure 2:
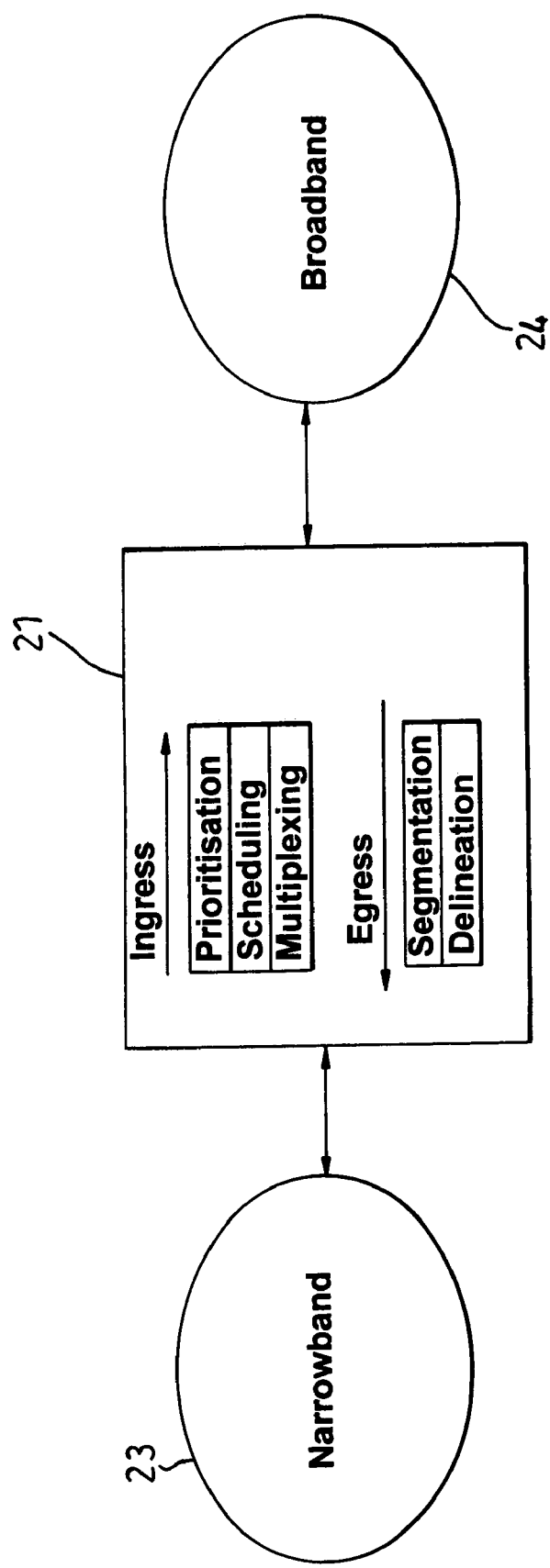
FIG. 2 illustrates in highly schematic form the principle of operation of a CPS adaptation device according to a preferred embodiment of the invention.

Referring now to FIG. 2, this illustrates in highly schematic form the functionality of a CPS adaptation device 21 according to a preferred embodiment of the invention. The functional partitioning and architecture of the adaptation device are advantageously optimised for the adaptation layer technology partitioning shown in FIG. 1. The adaptation device provides an interface between e.g. a TDM domain 23 and a broadband or ATM domain 24. In the ingress direction the device provides a prioritisation, scheduling and multiplexing function, while in the egress (flow through) direction the device provides a segmentation and delineation function to assign delineated data units to respective ports.

Figure 3:
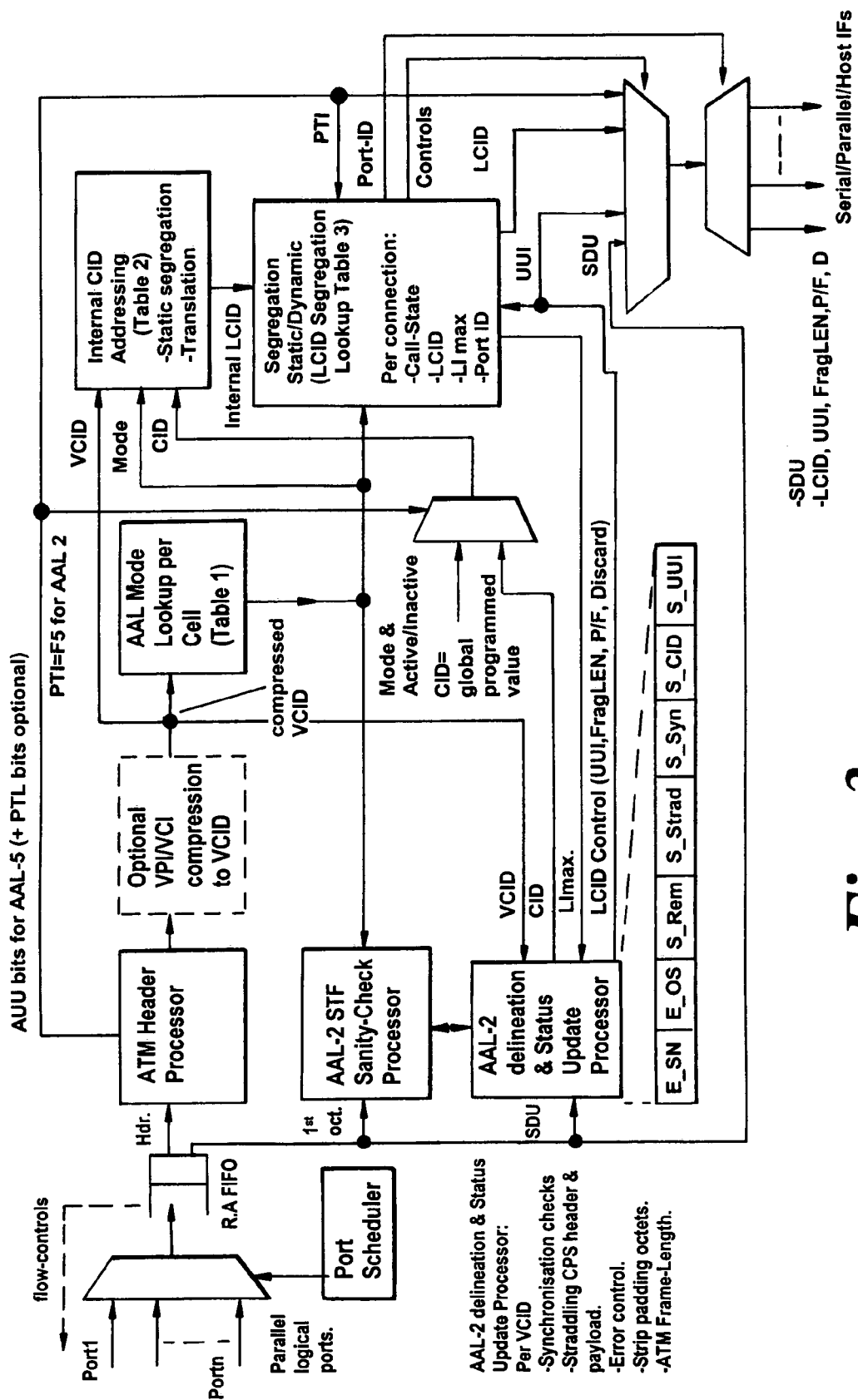
FIG. 3 shows an egress CPS functional partitioning overview according to a preferred embodiment of the invention.
Figure 4:
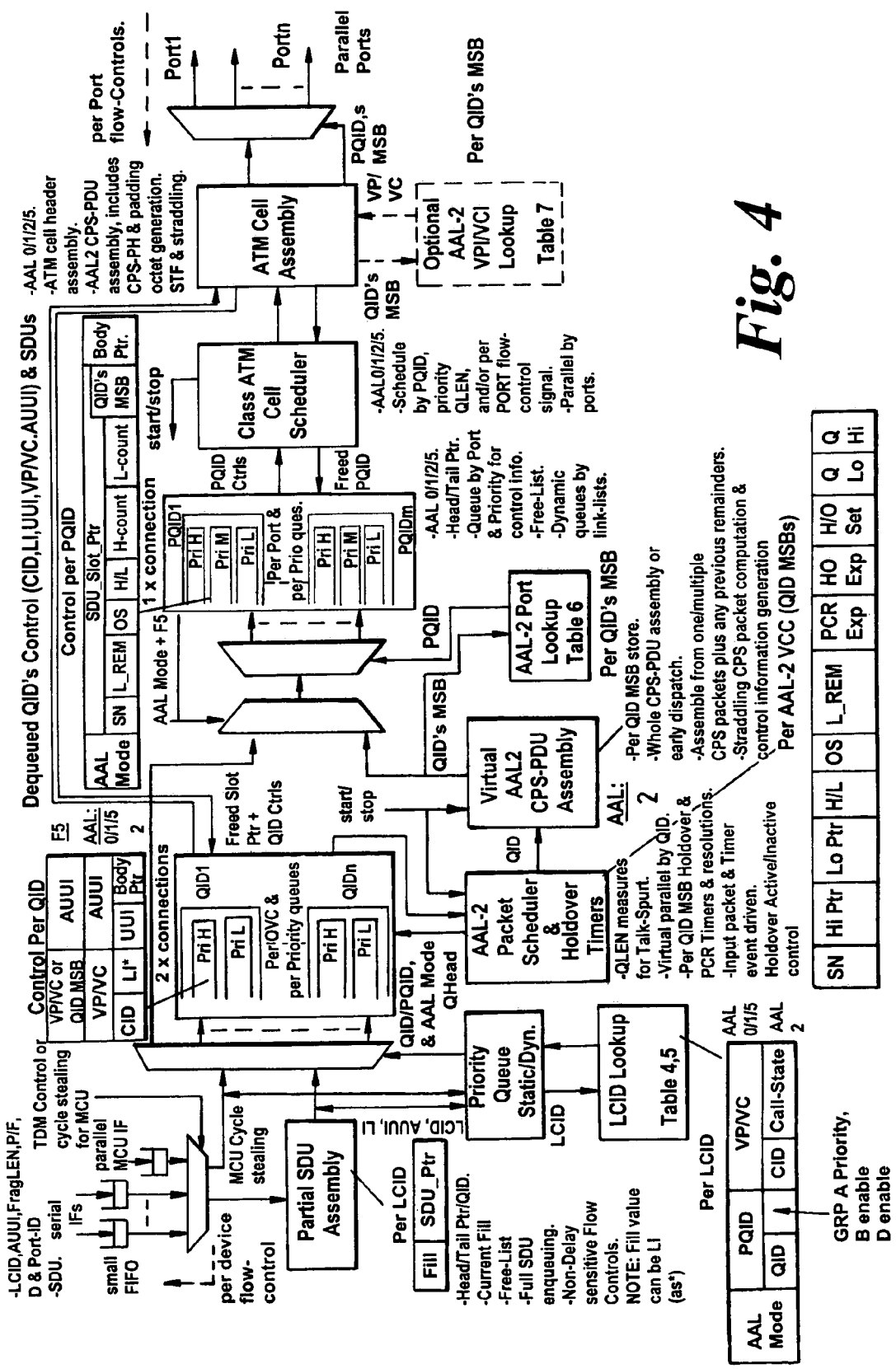
FIG. 4 shows the ingress CPS functional partitioning overview according to a preferred embodiment of the invention.

Referring now to FIGS. 3 and 4, these figures illustrate the functional partitioning of the CPS device of FIG. 2. FIG. 3 shows the egress traffic direction (ATM cells received from the ATM network by the CPS). FIG. 4 shows the ingress direction (ATM cells transmitted into the ATM network by the CPS device).

The following section details the optimal buffering architecture of the CPS device which facilitates its efficient operation.

In the ingress direction (FIG. 4) the CPS device provides a common payload memory which can be used for the storage of both AAL2 mini-packet SDUs and/or ATM cell SDUs. This provides the primary ingress buffer storage for the system and enables the overall system to operate according to a shared memory output buffered paradigm. Such a paradigm is preferred over other potential buffer schemes in that it minimises the overall sub-system delay, the memory requirements, the potential for blocking and the signal flow complexity. It also enables a degree of direct scaling with a generic packet switch when functioning as a port technology.

In the egress direction (FIG. 3) the CPS acts as a 'flow-through' device and hence does not need to provide any payload buffering. This enables the primary egress buffer to be located in the SSCS devices for trunking/interworking applications. Again this preserves the output buffer paradigm for the system as a whole which is optimum. For AAL2 switching applications the egress traffic is immediately re-routed to the appropriate ingress CPS device where the payload will be buffered.

Figure 5A:
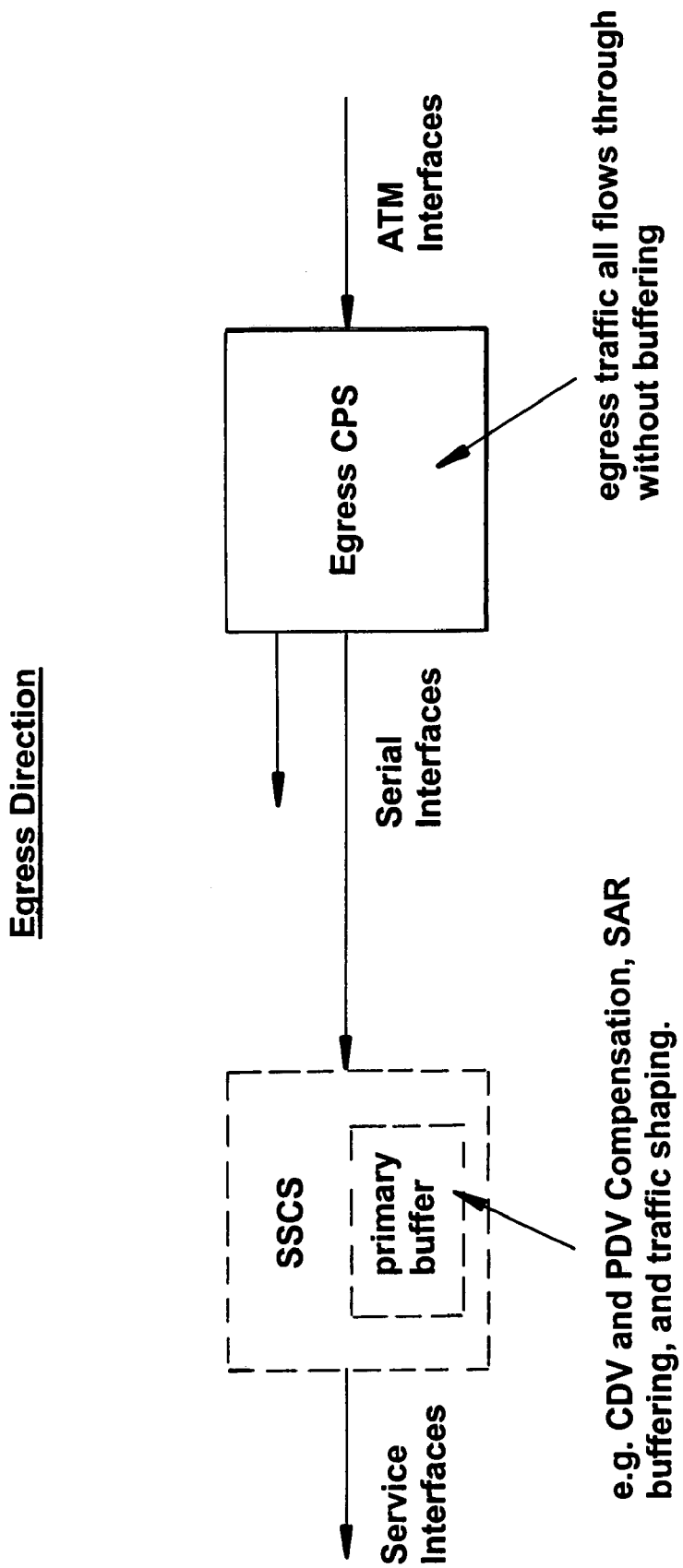
FIGS. 5a and 5b show the CPS buffering organisation with respect to interfacing SSCS/I_CPS functions in the egress and ingress directions.
Figure 5B:
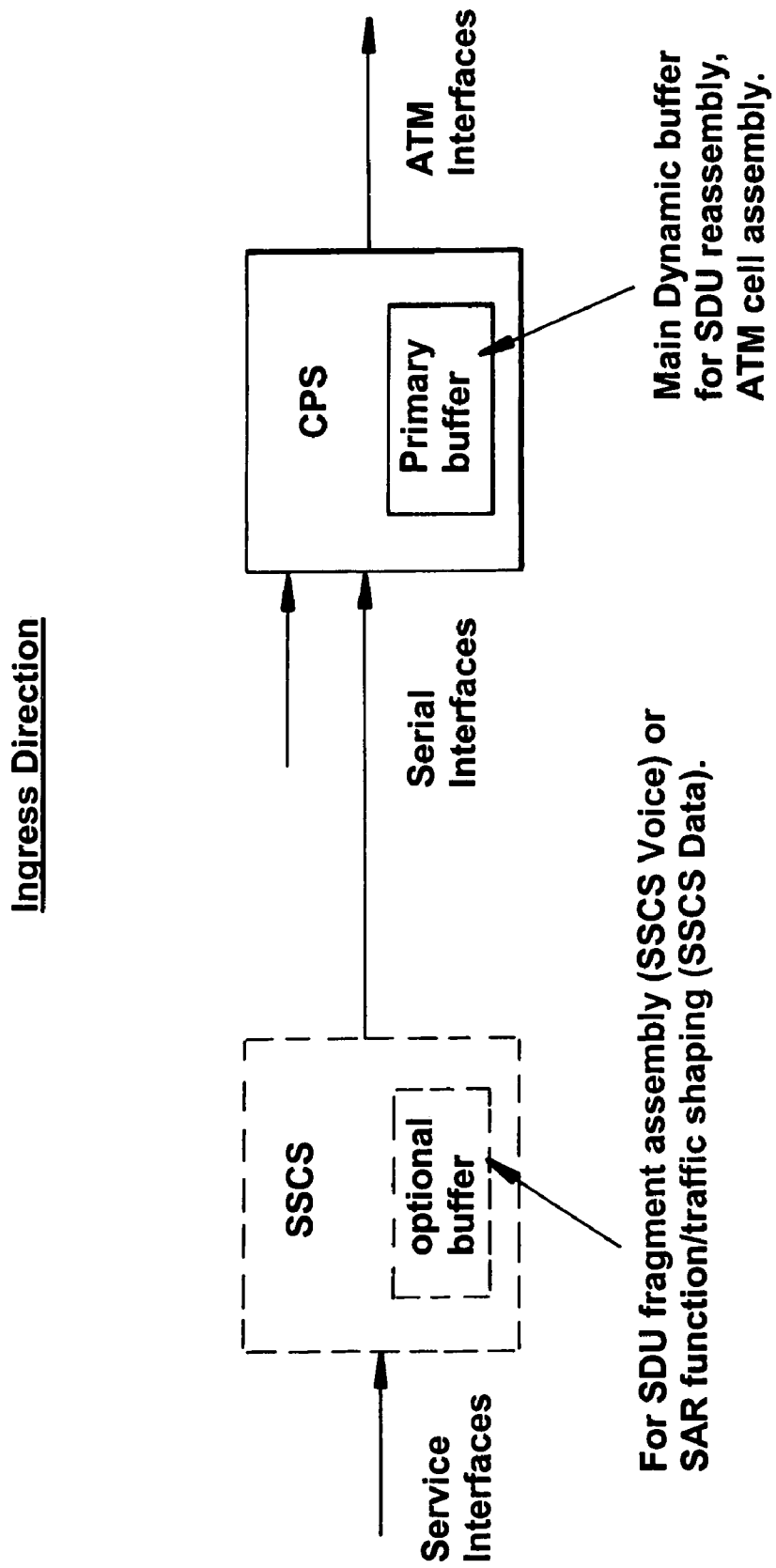

FIG. 5 illustrates the buffer organisation for the CPS.

From a system perspective, payload buffer storage is required in the ingress CPS for two main reasons:

1) at the ATM layer, to allow ATM cells to be scheduled to the ATM network (via an appropriate physical layer ATM device) according to traffic class and traffic priority.
2) at the AAL2 layer, to control the scheduling of the AAL2 SDUs (mini-packets) to assemble ATM CPS-PDUs. (The AAL2 layer scheduling function is performed according to the traffic contracts of both the underlying AAL2 bearer VCC, and the individual AAL2 connections.)

The partitioning of the ingress CPS memory also enables the ingress buffer to be used to store fragmented SDUs. Fragmented SDUs will occur naturally in AAL2 switching applications since an AAL2 mini-packet can straddle the boundary of one or more ATM cell payloads. However in the ingress CPS this capability is extended to enable the SSCS (or other similar device) to transmit any SDU (for all AALs) to the CPS device as any number of arbitrary sized fragments. This flexibility enables the ingress SSCS memory requirements to be minimised—effectively distributing the SDU assembly payload into the CPS device. Thus rather than assemble a complete SDU in the SSCS and then transfer it to the CPS which would require buffering in both parts which is inefficient in terms of both memory requirements and delay, minimal buffering is configured in the SSCS and thus only fragments of the SDU are assembled prior to transfer to the CPS—the CPS reassembles the fragments into complete SDUs.

The amount of total buffer storage required will vary significantly according to different applications, AAL types and SDU lengths. To optimally solve this demand the ingress CPS memory is organised as a dynamic buffer. This enables the buffer storage to be statistically shared by all of the services supported by the CPS device.

Figure 6:
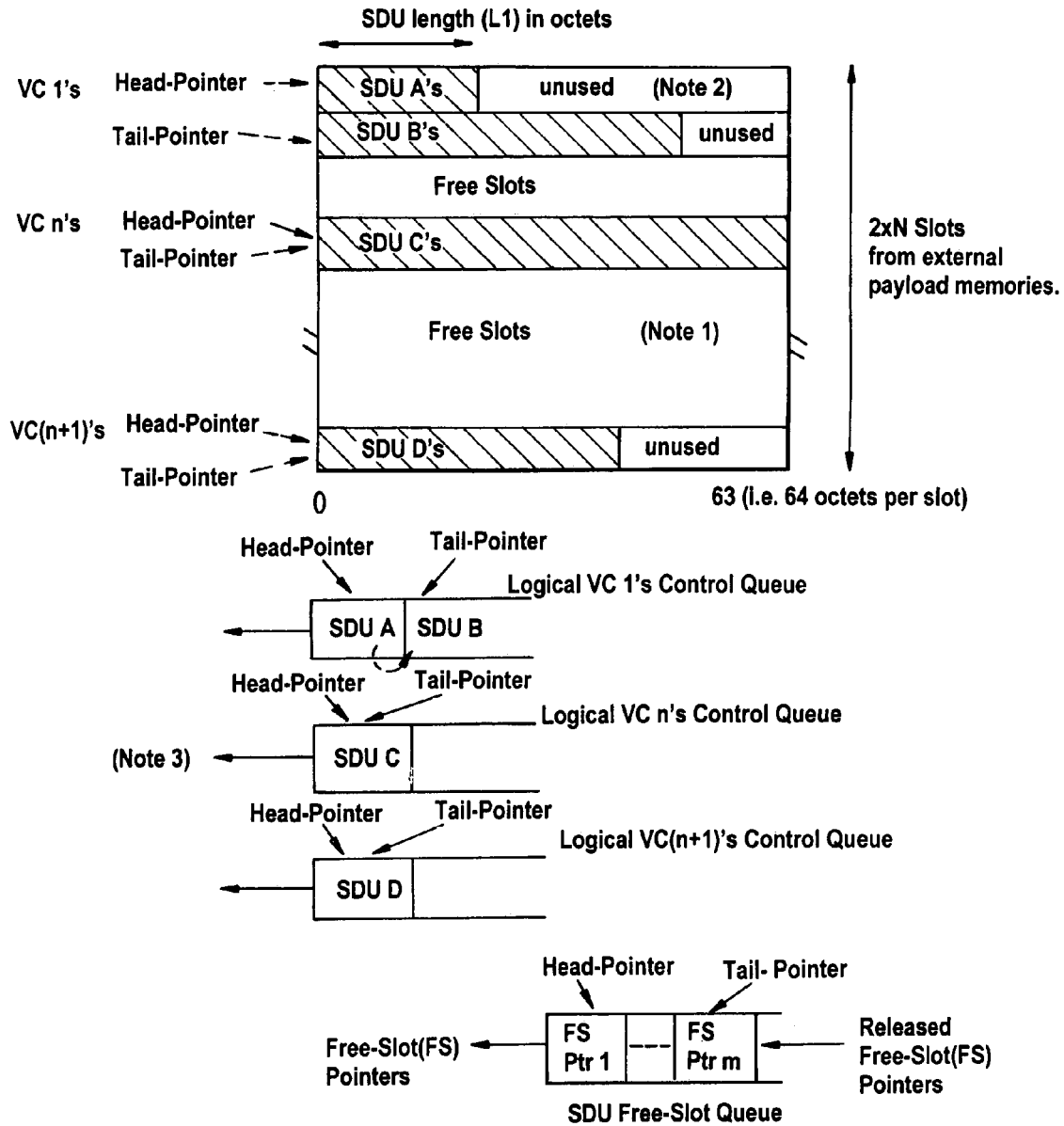
FIG. 6 shows the ingress CPS dynamic SDU buffer organisation.

As illustrated in FIG. 6, the dynamic CPS buffer architecture is logically organised as a shared buffer together with associated control and pointers. The dynamic SDU buffer is slotted—one slot stores a single SDU payload (e.g. up to 64 octets in length) together with associated control information (SDU length, identifier etc.).

This slotted buffering size ensures that both AAL-2 (maximum SDU size is 64 octets) and non AAL-2 (maximum SDU size is 48 octets including controls) SDUs can be stored in the same generic SDU buffer architecture. To store a new SDU an arbitrary unused slot is selected from the memory—a free-list of unused slots is maintained for this purpose. Once stored the data remains in the same slot until the data is physically transmitted to the ATM network (via the ATM interface). Within the CPS, an SDU can be logically moved through the functional processes by simply transporting a pointer to the slot to the required process. To queue an SDU within a process the CPS simply maintains a linked lists of pointers to the queued slots.

Referring again to FIG. 4 it can be seen that there are two logical layers where queues must be maintained: at the AAL2 packet layer where queues of AAL2 packets are maintained to enable the multiplexing of AAL2 packets into ATM CPS-PDUs and at the ATM layer where queues of completed ATM PDUs are maintained to enable the scheduling of ATM cells into the ATM network. Non-AAL2 SDUs are not subjected to queuing at the AAL2 packet layer.

AAL2 SDUs are subjected to queuing at both layers (logically as individual packets at the AAL2 layer and logically as part of the completed CPS-PDU at the ATM layer). At both layers the queues are maintained via linked lists. With the CPS architecture described, it is possible to organise either queuing layer in one of several different queuing paradigms. The queuing options for the AAL2 layer (or packet) queues are:

1) Per incoming link queues. AAL2 SDUs received over each individual input link to the ingress CPS are chained together into a single queue i.e. one link-list queue is maintained per serial link.
2) Per incoming (AAL2) VC queues. SDUs are queued according to their incoming AAL2 VC i.e one queue is maintained per incoming AAL2 VC.
3) Per AAL2 connection queues. Individual queues are maintained in the ingress CPS buffer per connection (within the CPS each individual connection is assigned a unique identifier termed an LCID).
4) Per outgoing AAL2 VCC queues. SDUs are queued according to their destination AAL2 VCC.
5) Per outgoing AAL2 VCC per priority. For each outgoing AAL2 VCC separate queues are maintained for each priority of traffic.

Although all of the above can be implemented in the CPS architecture, the preferred queue arrangement at the AAL2 layer is per outgoing VC per priority packet queues. This minimises the amount of control logic required for AAL2 traffic by providing only one queue per priority per VC. Note that for AAL2, the total number of VCCs is significantly lower than the total number of connections supported. Further this arrangement is optimal for the AAL2 CPS-PDU assembly/scheduling function as it enables full support of AAL2 packet level prioritisation and prevents head-of-line blocking.

Thus the AAL2 layer queuing function is maintained by implementing a number of linked-lists. Each linked list contains all of the packets in that queue. Each linked list is controlled by a set of head and tail pointers—one head and tail pointer is required for each packet layer queue supported. For each received packet the ingress function uses the LCID connection identifier to look-up the packet queue identifier (termed the QID) and uses this to chain the packet onto the appropriate queue. The local connection identifier (LCID) is a unique per-connection identifier used within the CPS device. The QIDs can be flexibly allocated to enable the CPS to trade-off between the number of VCCs supported and the number of priorities supported for each VCC. The QID MSBs identify the AAL2 VCC its LSBs the packet priority—thus assigning one LSB bit to priority implements two levels of priority; 2 LSBs enables 4 levels of priority (but halves the total number of VCCs supported).

At the ATM layer a full range of queuing options are also implementable in the CPS architecture including:

1) Per outgoing VCC queues.
2) Per outgoing port queues. SDUs are queued according to their outgoing port destination.
3) Per outgoing port per priority. For each priority of traffic, SDUs are queued according to their outgoing port.

To minimise control logic whilst preventing head-of-line blocking per outgoing port per priority queues are maintained at the ATM layer. This allows scheduling according to ATM cell layer priority to also be performed. Logical per port per priority queues are thus maintained by the CPS device. Again for each VCC connection the ingress function uses the LCID connection identifier (for non AAL2) or the AAL2 outgoing VCC to look-up the ATM cell layer port queue identifier (the PQID) and uses this to chain the packet onto the appropriate queue. In a similar manner to the AAL2 queues the PQIDs can be flexibly allocated to enable the CPS to trade-off between the number of ATM ports (logical or physical) supported and the number of priorities supported for each port. The QID MSBs identify the port, the LSBs the cell priority. The port queues are maintained by linked lists one list per port per priority. Each linked list contains a chain of control information for each cell queue in the port queues. At each location this control information stores a connection identifier and a mode identifier (indicating whether the cell is AAL2 or non-AAL2). For non AAL2 cells the control word also stores a direct pointer into the primary buffer store to locate the physical SDU. For AAL2, an indirect pointer mechanism is used—the control word stores the identity of the outgoing AAL2 VCC (the preferred implementation is to use the MSBs of the QID) and the packet composition of the SDU payload (effectively this states how many packets (full and partial) are used to form the payload, and from which of the priority queues each of the packets is taken). To physically assemble the cell SDU the CPS uses this control information to 'peel' the appropriate packets from the head of the AAL2 packet queues.

The queuing partitioning just described allows AAL2 and non-AAL2 traffic to be multiplexed together freely. This combination of queuing minimises the complexity of the device and optimises payload memory usage by dynamic sharing, eliminates the potential for head of line blocking whilst still maintaining the ability to support multiple priorities of traffic at both the AAL2 packet level and the ATM cell level.

The following section details the segregation and multiplexing functionality of the CPS device.

On egress, the received SDUs (cell SDUs for non-AAL2, delineated packet SDUs for AAL2) are segregated by the CPS and transmitted onto the appropriate system facing interface. As illustrated in FIG. 3, the egress CPS supports multiple serial and/or parallel interfaces. Each interface can be used to connect the CPS to for example an appropriate SSCS device or a general purpose micro-processor.

Depending on the ATM connection being supported the CPS can perform the SDU segregation function based on all of the following (or a subset of): the AAL Mode (i.e. the connection type—AAL2 or non-AAL2), the ATM cell PTI field (to enable support for OAM flows), the connection identifier (LCID), the user—user information (UUI) bits (AAL2) and the current Call State (for AAL-2) values.

For AAL2, a single connection can be used to transport voice or data (and dynamically change between the two). In the majority of cases the 5-bit UUI field is sufficient to determine whether the packet contains voice or data traffic (and from this which SSCS device should be used to terminate the packet). However an AAL-2 connection may also support Fax/Modem Demodulation and these packets may be transferred using the same AAL2 packet type (Type 1 as defined on I.366.2) as voice traffic and thus also use the same range of UUI values. In this scenario it is desirable to further perform the segregation function on the knowledge of the current 'call-state' of the connection—the call state of such connections can be modified by the Call Management whenever a transition between voice and fax/modem image data transfer needs to take place.

To support this flexible segregation within the CPS, AAL2 traffic is classified into one of a number of traffic groups according to its UUI codepoints. The CPS uses the definitions in Table 1 below to perform this function.

TABLE 1

AAL-2 UUI Codepoint assignments to Groups and segregation actions

| UUI Code-points | Packet Content | Segregation actions | Seg Group |
|---|---|---|---|
| 0 to 15 | Primary Service: Encoding formats for audio, circuit mode data, and demodulated facsimile data using type-1 packets | Segregate Per LCID: a) Audio/circuit mode data (group A) to a port address where an SSCS-Voice device is terminated. b) Facsimile data (group B) to a port address where and SSCS-Data device function/is terminated, when enabled by the Call-State. | A/B |
| 16 to 22 | Reserved for future assignment | Special add-on service globally enabled/disabled by the software for all LCIDs. | C |
|  | Unknown type | When enabled, the packet will be segregated to a common port address (SSCS-V/D); otherwise it shall be discarded and error is counted. |  |

TABLE 1

AAL-2 UUI Codepoint assignments to Groups and segregation actions

| UUI Codepoints | Packet Content | Segregation actions | Seg. Group |
|---|---|---|---|
| 23 | Optional Primary Service: Type-2 packets reserved for future voice or data services. | Add-on service, segregate per LCID: When enabled, the packet will be segregated to a port address (SSCS-V/D); otherwise it shall be discarded and error is counted. | D |
| 24 | Secondary Service: Type-3 packets for all data extensions, except Alarm packets. | Add-on service, segregate per LCID: When enabled, the packet will be segregated to a port address (SSCS-V/D); otherwise it shall be discarded and error is counted | B |
| 25 | Non-standard extension. Unknown type. | Special add-on service globally enabled/disabled by the software for all LCIDs. When enabled, the packet will be segregated to a ports address (SSCS-D); otherwise it shall be discarded and error is counted. | E |
| 26 | Secondary Service: Framed mode data, final packet. | Add-on service, segregate per LCID: When enabled, the packet will be segregated to a port address (SSCS-D/D); otherwise it shall be discarded and error is counted. | B |
| 27 | Secondary Service Framed mode data, more to come. | As UUI 26 | B |
| 28 to 29 | Reserved-by I.363.2; unknown type | Special add-on service globally enabled/disabled by the software for all LCIDs. When enabled, the packet will be segregated to a ports address (SSCS-D); otherwise it shall be discarded and error is counted. | C |
| 30 | Available for Layer Management by I.363.2: unknown type | Special add-on service globally enabled/disabled by the software for all LCIDs. When enabled, the packet will be segregated to a common port address (SSCS-D); otherwise it shall be discarded and error is counted. | E |
| 31 | Arlarm/OAM packets. | Unconditional per LCID. The packet may be segregated to one, or broadcast to two, port address (SSCS-D) if enabled by software for ALS. | F |

For non-AAL2 traffic the received SDUs are decoded into the traffic groups defined in Table 2 below according to the ATM PTI field.

TABLE 2

Group assignments and actions for other AAL-2 tupes/F5 OAM

| PTI's MSB | SDU Content | Segregation actions | Seg. Group |
|---|---|---|---|
| O x x | Primary Service: User audio, AAL-5 voice, circuit mode data, and facsimile data. | Segregate per LCID: to a port address where an SSCS-Voice device is terminated. | A |
| O x x | Primary Service: User data traffic such as AAL-5 messages for control and signaling, and IP etc. | Segregate per LCID To a port address where an SSCS-Data device/function is terminated | B |
| 1 x x | Secondary Service: FS OAM/user management traffic for all AAL types. | Special add-on service globally enabled/disabled by the software for all LCIDs. When enabled, the SDU will be segregated to a common port address (SSCS-D); otherwise it shall be discarded and error is counted. | E |

To perform the segregation function of the CPS addresses the Port-Address Lookup using the LCID of the received SDU. The coding of the Port-Address Look-Up is defined in Table 3 below. The segregation function is performed by the segregation static/dynamic function (see FIG. 3). This function maintains a look-up table (one location per internal connection) that is configurable by the system s/w.

The format of the look-up table is defined by table 3. It is addressed by the connections LCID which has been derived from the VC ID, AAL mode and from the AAL2 CID. One of the key fields shown in table 3 is the Port-Address Bit-Mask field which is used to identify which of the ports the SDU may be segregated to (a 1 indicates that the connection may be segregated to that port). The CPS uses a generic Port-ID field to address each of it physical ports. For example to support 5 ports (say 4 serial and one parallel) a 5 bit Port-ID is used. Each of the ports is assigned to one of the bits of this Port-ID.

The traffic group of the SDU is also decoded (using the UUI and the current Call State). For each traffic group there is a global traffic mask (i.e. a global mask for groups A,B,C,D,E,F)— each mask indicates the possible ports that the group may be terminated on. The global traffic group mask and the per LCID traffic mask are ANDED together to determine the destination port(s) for that SDU. (The call state—stored in the look-up-table—is used to distinguish between traffic group A and B for AAL2 when they share the same UUI codepoint space.)

For AAL-2 the UUI bits of the received packets are used to determine the traffic groups (again the Call State can be used to distinguish between fax modem and voice type 1 packets). The detected traffic group is then ANDED with a per (AAL2) LCID priority mask (each mask position indicates the priority of received packets for that traffic group for that LCID) to identify the priority of the received packets.

Thus the Priority Queue Static/Dynamic Function maintains a logical Lookup table for all AAL types per LCID; such that the LCID value of a complete SDU is used to lookup and determine the following per LCID Service Class and Control Information as follows:
  AAL Mode: (1-bit) A logical field to indicate whether the connection is AAL-2 or non-AAL2 (i.e. AAL-0/1/5).
  For non-AAL2 the PQID:—A field which defines implicitly the ATM layer port and priority.
  For AAL2 mode:
    The Outgoing VC-Queue ID (QID).
    the Traffic Group Priority bit mask.

At the AAL2 packet layer, the QoS (in terms of delay through the system) of an ingress LCID packet can be

TABLE 3

Compressed per LCID Port-Address Table

Logical Fields in bits stored for location

| Input Address width (bits) LCID | O/P LCID (note 1) | LI max. (note 2) | Call-State | Discard Group-B (note 3) | Discard Group-D (note 4) | Port-Address Bit-Mask |
|---|---|---|---|---|---|---|
| 13 | | | 1 | 1 | 1 | 6 (Note 2) |

Note 1: O/P LCID enables an LCID translation between egress and ingress functions to occur when cascading multiple devices -typically used in AAL 2 switching applications and ensures that all devices can use their own sparse LCID set.
Note 2: AAL2 standard specifies that per connection a maximum CPS packet size of 45 or 64 may be configured.
Note 3: Discard AAL-2 Packet-Group B or D (defined in Table 1) if set.
Note 4: Common 6-bits Port-Address Bit-Mask for 4 × serial, 1 × parallel (MCU), and 1 × local Host Interfaces. Each Port is bit-mapped to one pre-defined position of the Bit-Mask by software, with logical "1" to enable or logical "0" to disable the port.

The following section describes the flexible scheduling capability of the CPS ingress process.

The ingress CPS is primarily functioning as a multi-service multiplexer for both delay sensitive (i.e. voice or circuit mode) and non-delay sensitive (i.e. data) traffic. This is achieved by providing multiple levels of priority and queuing over the ingress traffic in the CPS depending on the agreed traffic contracts. Multiple levels of priority and queuing are provided at both the packet layer (for AAL2) and the ATM cell level (for all AALs).

The assignment of the received SDU to a given queue (QID for AAL2—PQID for non-AAL2) is performed using a pre-configured LCID Lookup Table for all AAL types. The term QID is used to define an AAL2 packet queue. The term PQID is used to define an ATM SDU queue. The look-up table identifies, the mode (AAL2/non AAL2) of the SDU, and the queue identifier per outgoing VC (OVC) per priority for AAL2 per port per priority for non AAL2.

Again for an AAL-2 Connection that supports Fax/Modem Demodulation, an LCID may transfer/receive both voice and fax/modem image data simultaneously via similar Type-1 packets as the call progresses. The two-call states may be assigned differing priority levels (and thus PQID). Therefore a dynamic segregation function similar to the egress direction is employed to achieve this controlled by assigning it to a given priority level (and thus given priority queue for that outgoing VC (OVC) depending on the traffic contract.

The packet queues are monitored by the packet scheduler to assemble the CPS-PDUs. The packet scheduler operates in parallel across each AAL2 VCC. Within a VCC, the packet scheduler logically assembles packets to form CPS-PDUs—strict sense priority or any other priority mechanism can be used to schedule the packets within an AAL2 OVC queue.

The second level of scheduling occurs at the ATM PDU level (for all AALs). As the CPS is architectured to support multiple AAL services (i.e. AAL-0/1/2/5) which may carry multiple priorities of traffic such as delay sensitive voice and non-delay sensitive data services. For optimal ATM bandwidth utilisation the CPS can be interfacing with multiple external lower bandwidth ATM layer devices via the ATM Interface. Therefore a generic ATM port buffering architecture which is capable of supporting multiple AAL's ATM SDUs, eliminating the potential head of line blocking, and minimising the ATM scheduling delays for high priority traffic is extremely desirable. For the above reasoning the ATM port of the ingress CPS is organised to have per Port per Priority queuing architecture to fulfil the required objectives just described. The ATM port queues are logically maintained in the ingress CPS by their own per Port per Priority Head-and Tail-Pointers, but still sharing the dynamic SDU buffer memory resource.

An overview of egress CPS functional partitioning and main traffic flows are illustrated in FIG. 3. It is assumed that all the necessary device parameters have been setup by the system software. For scalability reasons the egress ATM Interface is a standard UTOPIA L2 Interface controlled by a Port Scheduler. Depending on the number of physical ports to be interfaced with, the Status Signals of each port can be structured as direct Status Indication, or by multiplexed Status Polling to maximise its cascading flexibility.

Through a cell rate-adaptation FIFO the egress ATM cell headers are terminated in the ATM Cell Header Process which delineates the cell header to extract the VCC's VPI/VCI and PTI fields for internal connection type and routing checks. The extracted VPI/VCI may optionally be looked up for an internal compressed VCID value, if it has not been pre-compressed by an external ATM layer device. This provides a flexible design choice to the user depending on their applications and networks.

The compressed VCID is then used to lookup whether the ATM connection is AAL-2 or non AAL-2 (AAL-0/1/5) from a pre-configured AAL-Mode Lookup Table. The VCID and mode for an AAL2 only CID of the PS packet is applied to an internal CID addressing process which uses a content addressable RAM look-up table to return the local connection identifier(LCID). The LCID is used in subsequent processing to determine how to process the received SDU. The CAM is chosen for its data storage and addressing efficiency when needing to perform a look-up function to compress a wide range of potential data values into a sparse data set.

The LCID Mode is used to address a further look-up table based within the segmentation static/dynamic function that returns the common connection parameters such as Local Channel IDs (LCID), and AAL-2 specific parameters such as the permissible maximum packet payload lengths (LImax) and connection Call-States. The unique LCID used within the egres CPS may be translated prior to transfer to an external device (ingress CPS or SSCS) to ensure that the translated LCID is unique to that device. Two parallel AAL handling processes (one for AAL-2 and one for non AAL-2 services) can co-exist in the egress CPS simultaneously. For non-AAL2 VCCs (AAL-0/1/5), as identified by the AAL-Mode, the complete 48 octets of its SDU always flows through without further processing and is segregated to the appropriate serial/parallel port by the Segregation Static/Dynamic Function (previously described).

For an AAL-2 VCC, as identified by the AAL Mode, the ATM SDU will be further processed in the AAL-2 STF Sanity-Check and Delineation & Status Update Processors respectively (described below) to delineate the constituent CPS Packets from the CPS PDU.

After the VCC is identified as AAL-2 from the AAL-Mode, the CPS PDU (ATM SDU) STF byte is checked for Parity, Sequence Number, or Offset errors in accordance with the ITU.T I363.2. If an error is detected subsequent error processing is performed. For example if the received STF is detected with parity error or an offset value greater than 47, the complete CPS PDU will be discarded without further processing and a synchronisation error recorded for that VCC.

To perform the error check function (at a minimum) the following per VCC Status Records are maintained by the AAL-2 Delineation & Status Update Processor: Per VCC status fields are:

E_SN: Expected STF Sequence Number.
E_OS: Expected STF OS value.
S-REM: Remaining packet length to be sent or just the stored 'LI' from a straddled packet header (indicated by S-Strad)
S-CID: Straddled CPS packet CID field, justified by S_Strad.
S-UUI: Straddled CPS packet UUI field, justified by S_Strad.
S-Strad: Defines the number of straddled CPS packet header octets that may be found in the current CPS PDU, i.e possible values are 0, 1, and 2.
S-Sync: Used to signal CPS-PDU error states (for example 'No Error', STF Invalid, and 'STF Offset Not Expected');

With the above per VCC status records the STF Sanity-Check Processor is able to check for correct VCC's CPS PDU synchronisation and takes the necessary error handling actions separately to optimise the CPS Packet delineation process to be carried in the AAL-2 Delineation & Status Update Processor (described shortly).

Every time an AAL-2 CPS PDU is checked by the Processor, the above per VCC status records are recalled and used. For example if any of the expected STF checks failed, the current straddled CPS SDU (if present) of that VCC would be discarded. The Segregation Static/Dynamic Function would be told to signal the corresponding SSCS function (Voice/Data via the serial/parallel interface), to discard the previous partial CPS SDU payload still held in its buffer by sending a Control Word indicating that the partial fragment should be discarded.

This STF sanity check process repeats for each AAL-2 CPS PDU which passes the ATM Header Processor check.

The other stored fields—S_REM, S_CID, S_UUI, and S_Strad fields are used to support the AAL-2 Delineation Processor to be described below.

At the beginning of this process, the STF Sanity-Check Processor supplies a valid STF Offset value, which indicates exactly where to the right of the current STF octet the next (first) CPS Header octet may be found, to the AAL-2 Delineation Processor. The AAL-2 Delineation Processor uses this STF Offset value to determine whether a valid CPS Header's HEC check can be determined at the third octet location from that point, which will signal a successful CPS Packet delineation if it is true; or just the padding fields (CID="0" value) which will be discarded from that point till the end of the remaining CPS PDU.

There are several different scenarios that occur due to the straddling of an AAL2 packet over one or more ATM cell payload boundaries. For example the packet header may straddle between two ATM cell payloads. The AAL-2 Delineation Processor uses the S_Strad field to locate the possible HEC field from the current straddled CPS header's octets and to check with the previous header octets (i.e. 2 or 1) already stored for a match. In this scenario S_STRAD is non-zero and therefore S_REM stores the straddling header's LI value. Another example is a long CPS packet (LI>=47) which may straddle over three successive CPS PDUs such that the second CPS PDU is completely filled (STFOS=47—no packet boundaries in that cell payload), whilst the third CPS PDU has one or more octets left over. In this special case S_STRAD is set to 0 to indicate that the S_REM field stores the remaining straddled packet length.

Whenever a successful CPS Header check is achieved, the Channel ID (CID), payload length (LI), and UUI of the CPS packet are extracted. As previously described, the CID, AAL Mode, and its associated VCID are used to return the LCID and the connection parameters including LImax, i.e. the maximum permissible packet length for that connection. Provided the extracted LI value does not exceed LImax for the LCID, the SDU (full/partial) and its LCID, LI (full/partial), UUI, and control information are passed on to the Segregation Static/Dynamic Function to prepare for the transfer to the destined CPS/SSCS device.

AAL2 or other delineation error handling is provided in the CPS. In normal operation if the CPS header check is invalid the remainder of the CPS PDU is discarded (and delineation begins again from the start of the next CPS PDU). The exception to this occurs if the header octets straddle a CPS PDU boundary. For this CPS packet only if the HEC fails then the straddling packet is discarded but the STF offset can be used to find the next packet boundary and delineation begins again at that point.

The pre-configured LImax provided by the LCID Lookup CAM permits the per CID user's contractual packet length to be monitored, and discarded if exceeded to achieve a level of bandwidth control within an AAL-2 VCC. The above processes are always repeated for each CPS PDU, and in particular checking for straddling CPS packet's headers and their payload octets across the CPS PDU boundary. The corresponding VCC Status RAM records are then updated at the end of the current CPS PDU to permit the CPS PDU synchronisation be continuously maintained for all the AAL-2 VCCs.

The received SDUs (cell SDUs for non AAL2, CPS packet SDUs for AAL2) are then transferred across the appropriate port interface via the Segregation Static/Dynamic Function. The operation of this function has already been described in detail.

An overview of the ingress CPS functional partitioning and traffic flows are illustrated in FIG. 4, and it is assumed that all the necessary configurable device parameters have been setup by the system software.

The ingress CPS provides the primary buffering for all AAL services in all operational modes, including trunking/interworking and AAL-2 switching, it thus acts as the logical output of an adaptation layer technology sub-system for optimal buffering. For these reasons the ingress CPS is always required to support multiple instantaneous traffic accesses, via the serial or parallel interfaces, from either SSCS-Voice/-Data devices for trunking/interworking, or egress CPS devices for AAL-2 Switching. The ingress CPS primary buffer must therefore be capable of sustaining the peak multiple access traffic rate to avoid any potential blocking and to minimise the serial/parallel FIFO depths.

In this preferred embodiment the ingress CPS provides a strict TDM-like primary buffer access to all serial interfaces such that each interface is only allowed to write to the primary buffer if it has valid data at that fixed cycle time. Otherwise its "write" cycle may be used/stolen by the parallel interface for writing data into the primary buffer instead. The CPS is therefore architectured such that the parallel interface is primarily used for the SSCS-Data or similar function which always maintains an internal Segmentation-and-Re-assembly (SAR) function for data traffic over the parallel interface. The ingress CPS parallel interface, which supports flow-control to avoid overflowing the dynamic SDU buffer in CPS, always uses "write-cycle" stealing from the serial interfaces for accessing the dynamic SDU buffer. The CPS needs therefore to only maintain a shallow rate adaptation buffer for the parallel interface. Those skilled in the art will appreciate that there is no restriction in providing a full rate interface too.

For similar reasons and CPS congestion management reasons an ingress flow-control mechanism is supported on each of the serial/parallel interfaces such that when connected to an SSCS data device (or similar) the serial (or hard-wired) flow control signal may be applied to temporarily halt the flow of incoming traffic on that serial/parallel interface.

For all AAL services in the chip-suite, partial SDUs of any length can be received by the ingress CPS as successive data fragments (these occur naturally in AAL2 switching and for interworking/trunking multiple fragments enables the SSCS payload assembly RAM to be minimised).

The fragmented SDUs have to be individually assembled back into their original complete SDU forms in the ingress CPS before further SDU processing can take place. The Partial SDU assembly process maintains a Status RAM which provides per LCID working records of all ingress partial SDUs. This per LCID Status-Record has the following logical fields:
  SDU_Pointer: A logical pointer which indexes to the data slot location in the dynamic SDU buffer in which the partial SDU is being assembled.
  Fill: A field whose binary value represents the current built-up length of the partial SDU.

A partial/full field (P/F) within the control field of transmitted SDU fragments identifies whether each fragment completes the SDU. The LCID extracted from the Control-Word is used to recall the current partial SDU status from the Status RAM. The "next-write" location into the payload buffer can be computed from the SDU pointer and the "Fill" values to continue assembling the partial SDU octets in the dynamic SDU buffer. In parallel with this the total partial length (Fill) is. The LCID's partial SDU status-records are then instantly updated at the end of the partial SDU write cycle. This process is then repeated until the SDU is fully assembled. (The final fragment is always indicated by a change in the logical state of the "P/F" field in the Control-Word.)

Once completed the SDU is transferred (logically not physically) to the Priority Queue Static/Dynamic function for further processing.

The Priority Queue Static/Dynamic function works as previously described to segregate the incoming completed SDUs onto the appropriate queues (per OVC per priority packet queues for AAL2 SDU packets, per port per priority queues for cell SDUs).

Figure 7A:
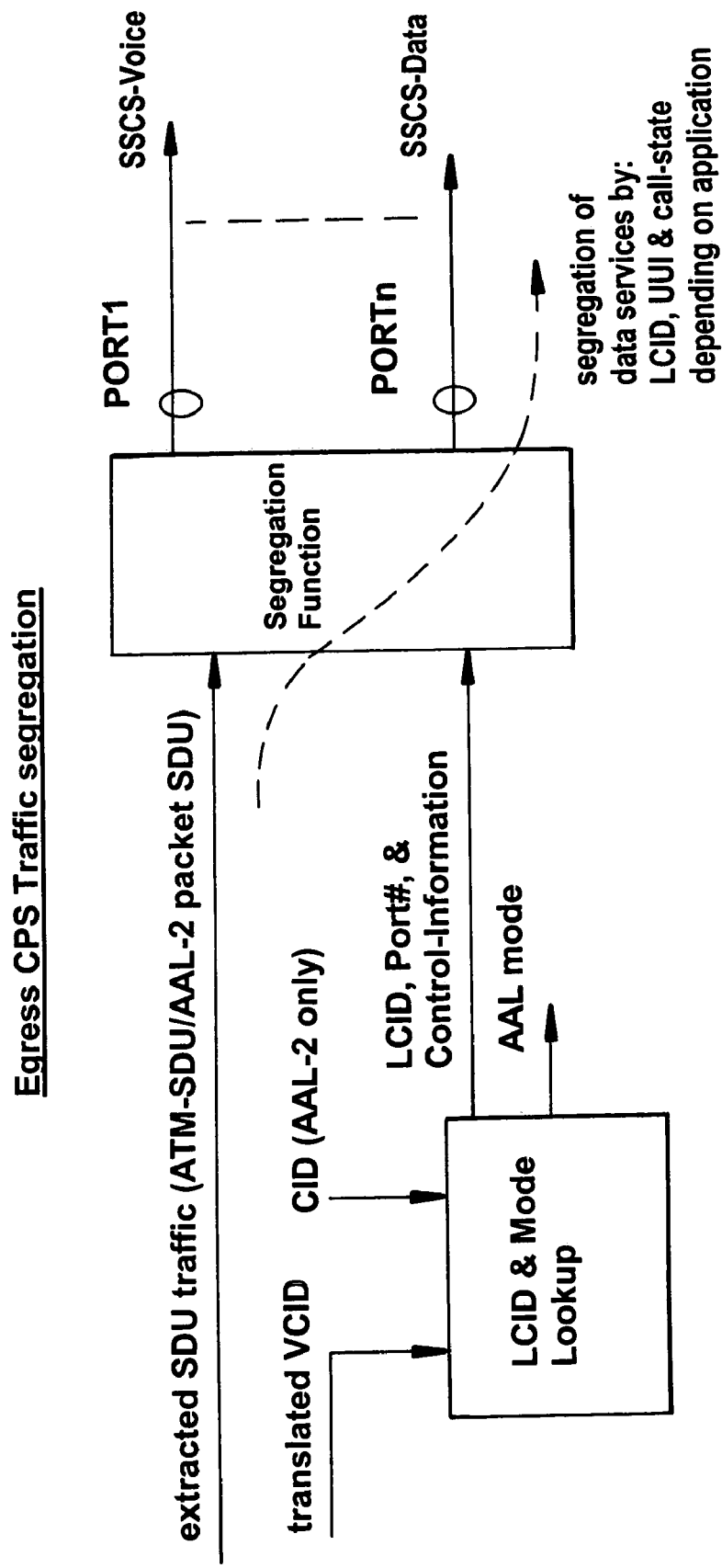
FIGS. 7a and 7b illustrate the egress and ingress CPS flexible scheduling capabilities and priorities.
Figure 7B:
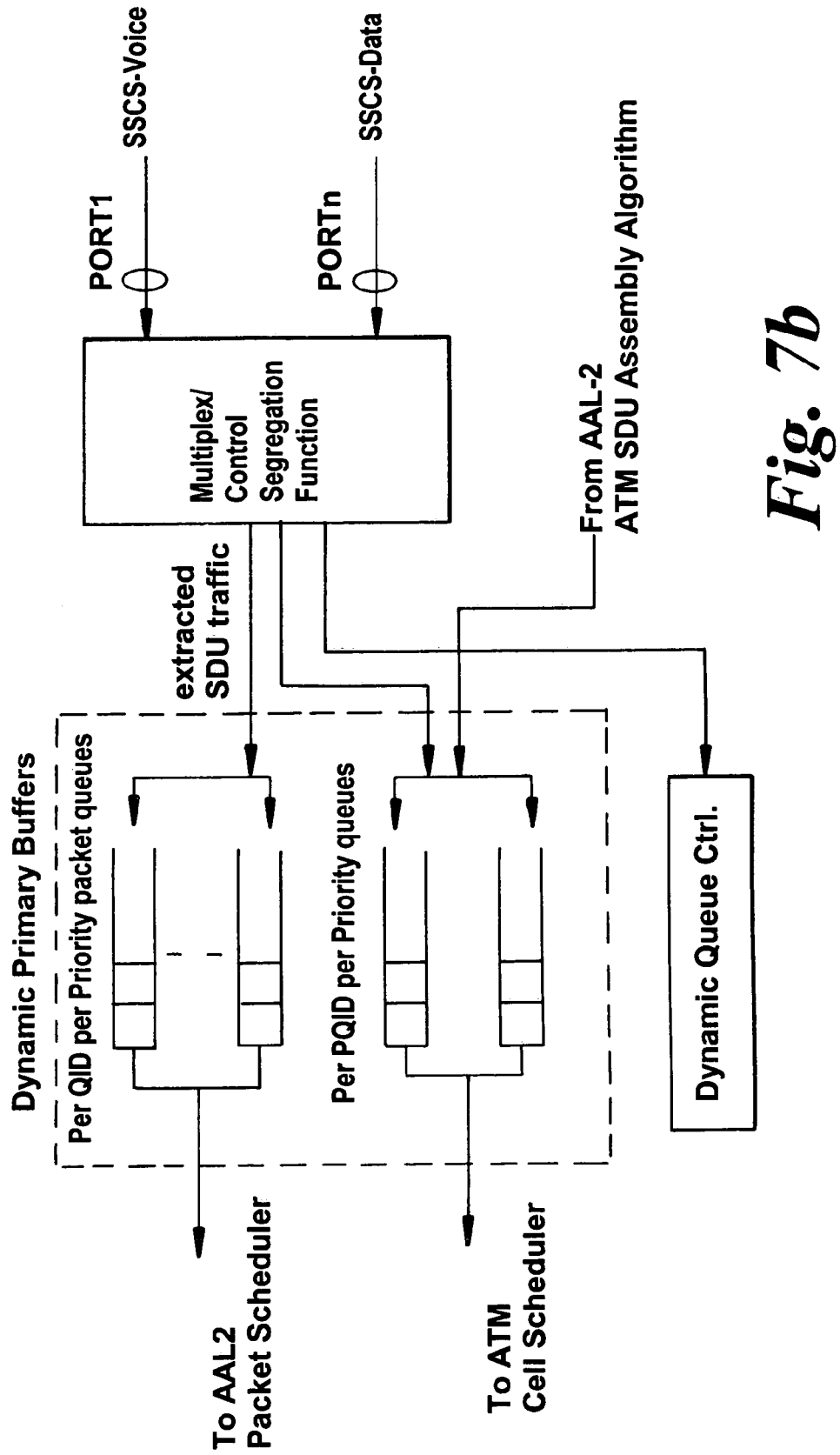

A packet scheduler function is used to schedule the multiplexing of the received AAL2 packets to form ATM CPS PDUs. The packet scheduling algorithm serves all the AAL2 VCCs in parallel. The packet scheduling algorithm may be implemented either as a single algorithm, servicing all VCCs in a (weighted) round-robin manner or implemented as multiple (per OVC) schedulers operating in parallel. Exemplary flexible schemes for scheduling capabilities and priorities are illustrated in FIGS. 7a and 7b.

Per OVC, packets are always scheduled according to their priority. Either a strict-sense priority mechanism or a statistical weighted priority mechanism can be enabled by the architecture of the CPS. The packet scheduler determines when to schedule the assembly of an ATM CPS PDU. This is calculated based on the arrival of packets upon the OVC queues together with the defined traffic contract for the bearer VCC. At the appropriate scheduling intervals, the packet scheduler triggers the virtual AAL2 CPS PDU assembly algorithm.

To avoid potential congestion in the ATM cell scheduler the packet Scheduler algorithm supports a flow control mechanism that enables the cell scheduler to request the Packet Scheduler to temporarily stop serving all OVCs (or selected OVCs).

The packet scheduling process just described is constantly supported by a background per OVC Holdover timer Algorithm as defined in the ITU-T I.363.2 Standard. This is to ensure that any packets multiplexed onto an ingress AAL-2 ATM SDU by the AAL-2 packet scheduler, will always be guaranteed their minimum dispatch times onto an external ATM layer function, which is analogous to the CPS's per Port per Priority Queue, not later than a pre-set "hold-over" timer value for that VCC.

This process is per ATM SDU based and is irrespective of whether the ATM SDU is fully filled with traffic to 48 octets or not. An ATM SDU can hence be dispatched via the ATM cell Scheduler with the necessary padding/null octets if the pre-set "hold-over" timer has expired. This process provides a flexible way in the ingress CPS to be able to selectively minimise the scheduling delays of the high-priority packets out of the sub-system according to their traffic contracts.

The per OVC Holdover timers run asynchronously in parallel to the Virtual AAL2 CPS-PDU Assembly process at all the times. Per OVC the Holdover value can be programmed by software—the CPS also supports the ability to turn the Holdover timer off on a selected VCC. However if enabled, when a Holdover timer expires prior to the CPS PDU being fully scheduled, the CPS PDU will be scheduled. The completed ATM PDUs are transferred to the appropriate ATM per port per priority queue (to be described).

As the CPS is architectured to support multiple AAL services (i.e. AAL-0/1/2-5) which may carry multiple priorities of traffic such as delay sensitive voice and non-delay sensitive data services; for optimal ATM bandwidth utilisation the CPS can be interfacing with multiple external lower bandwidth ATM layer devices via the ATM Interface. Therefore a generic ATM port buffering architecture which is capable of supporting multiple ATM ports, eliminating the potential head of line blocking, and minimising the ATM scheduling delays for high priority traffic is extremely desirable. For the above reasoning the ATM SDU scheduling process for the ingress CPS is organised to have a per Port per Priority queuing architecture (as already described).

The ATM port queues (PQIDS) are logically maintained in the ingress CPS by their own per Port per Priority Head-and Tail-Pointers. The ATM port queues consist of chained 'control words'. Each control word identifies the AAL mode and contains the address in the primary buffer where the SDU may be located. This address is direct for non AAL2 and indirect for AAL2—the indirect address consists of the OVC identifier and control information to define which packets from which priority the SDU is assembled.

The ATM Cell Scheduler schedules ATM cells from the port queues according to their port priority. At each cell transmission interval the cell scheduler determines which port has access to the common UTOPIA interface (normally this is done on a strict round-robin basis).

Once the port is selected the cell scheduler selects an SDU from the appropriate per port per priority queue. The priority selection can be performed either using strict-sense priority statistical priority or any combination thereof.

Once an SDU is selected (i.e. its control information taken from the top of the queue) the physical cell is assembled using the control information. For AAL-2 the control information and OVC identifier provides the necessary information to the ATM Cell Scheduler to determine which packets to read (from which QID queue) to assemble the cell. The cell assembly process will thus peel packets form the primary buffer (updating all appropriate linked lists).

For AAL-2 the ATM Cell Scheduler may optionally use the QID's MSB (i.e the OVC) to look up for the uncompressed ATM VPI/VCI values directly from an optional look up table without requiring further VPI/VCI translation outside the CPS. This provides a flexible design choice to the user depending on their applications and networks.

For non AAL-2 ATM cell assembly, the ATM PDU assembly process is much simpler. The control word contains a direct pointer into the primary buffer and the SDU is thus fetched.

Traffic congestion may only occur in the ingress CPS's primary buffer but not in the egress CPS which is always acting in a flow through manner. The ingress CPS is architectured to manage any potential congestion caused by misbehaved traffic as briefly described below.

Talk-spurts are typical traffic characteristics inherited from the AAL-2 or similar service connections in which both compressed-voice and data CPS packet users are usually multiplexed in any order on to a lower bandwidth transport pipe to maximise the available bandwidth utilization from the transport element. In AAL-2 trunking or interworking for example, compression of the nominal 64 Kbit/s voice traffic into much low-rate CPS Encoded Data Unit (EDU) packets and also suppression of silence/null traffic from the talkers is a common strategy to achieve high statistical bandwidth utilization. Unfortunately due to the statistical nature of talkspurt behaviour—(particularly on low speed circuits) periods of congestion can occur when a large number of users are simultaneously in the talk mode. Under these conditions buffer build up can occur either on a single VCC connection or potentially over multiple VCC connections. Many codec schemes enable the compression rate to be increased during periods of system congestion and therefore the CPS is provided with a number of mechanisms that enables congestion to be monitored and alarms raised.

Primarily the queue depths of all queues are monitored (packet queues and cell queues). Thresholds can be programmed for all queues (and for aggregate queue lengths). If the thresholds are exceeded the CPS can either apply flow control signals to its interconnected devices or raise an alarm to the processor (which in turn may signal to the CODECS to increase compression).

The primary CPS partitioning objective for the Generic Adaptation Technology (GAT) Chip-Suite is to act optimally as the generic CPS functions between its logical ATM layer Service Access Point (SAP) in the ATM network direction and its SSCS functions in the Service/Application direction irrespective of the AAL types. It therefore performs the most structured (in terms of logical buffering) and efficient (in terms of ATM SDU processing) voice and data traffic demultiplexing/multiplexing function for the interfacing SSCS Voice and Data Devices for the three AAL types (AAL-1, -2 & -5). This is previously described and illustrated in FIG. 3 to FIG. 4.

Figure 8:
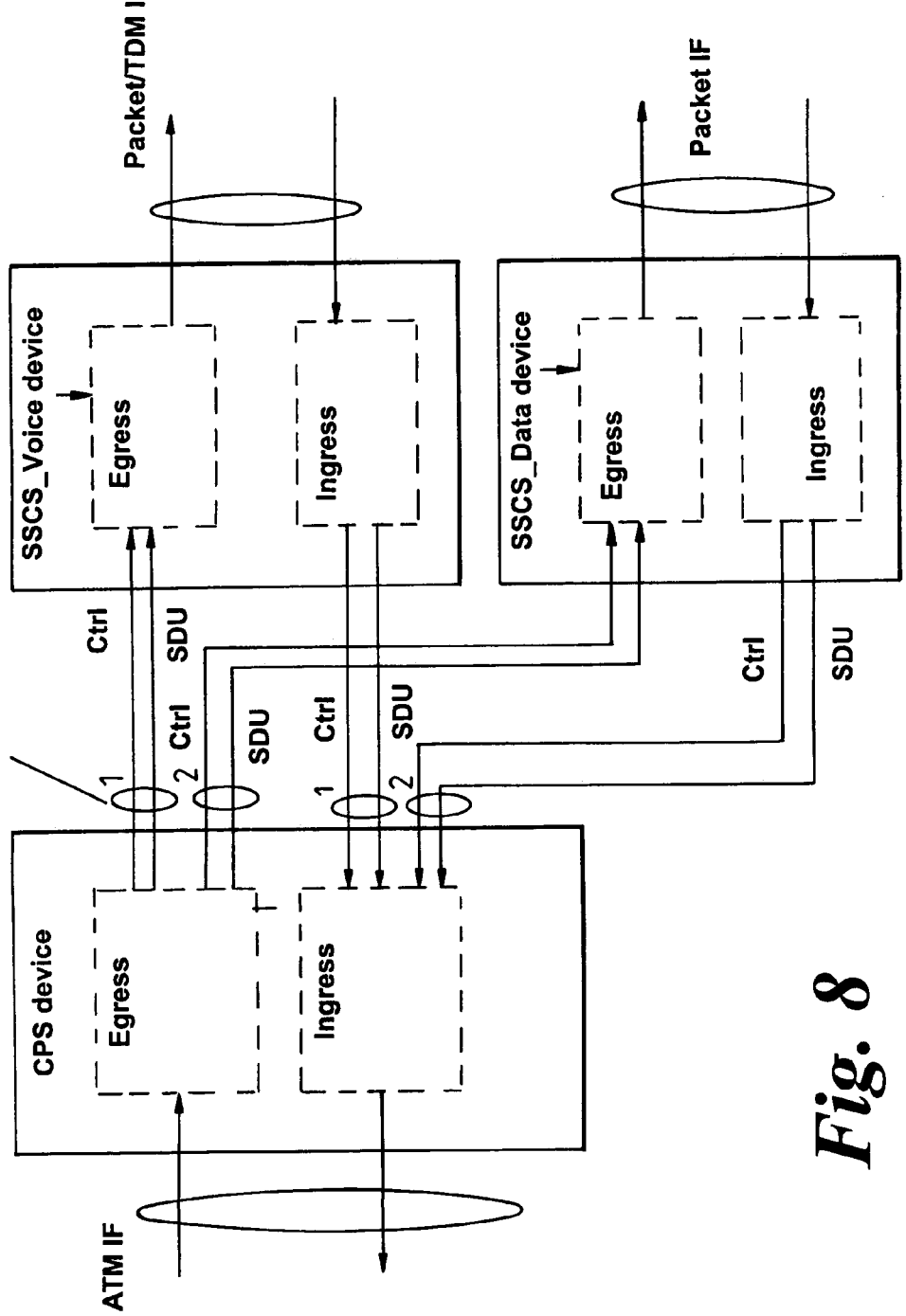
FIG. 8 shows an example of use of CPS and SSCS devices for Trunking/Interworking.

This highly structured and generic CPS partition optimally permits the chip suite to be used in the trunking/interworking and AAL-2 switching applications with the maximum scalability and flexibility. FIG. 8 illustrates an example of using the CPS, SSCS Voice and Data devices in the trunking/interworking application with the flexibility of combination of the AAL services (AAL-1, 2, & -5) provided the necessary Digital Signal Processors (DSP) are logically in place. For clarity, the host interfaces, e.g. microprocessor interfaces, to each device are not shown in FIG. 8.

Figure 9:
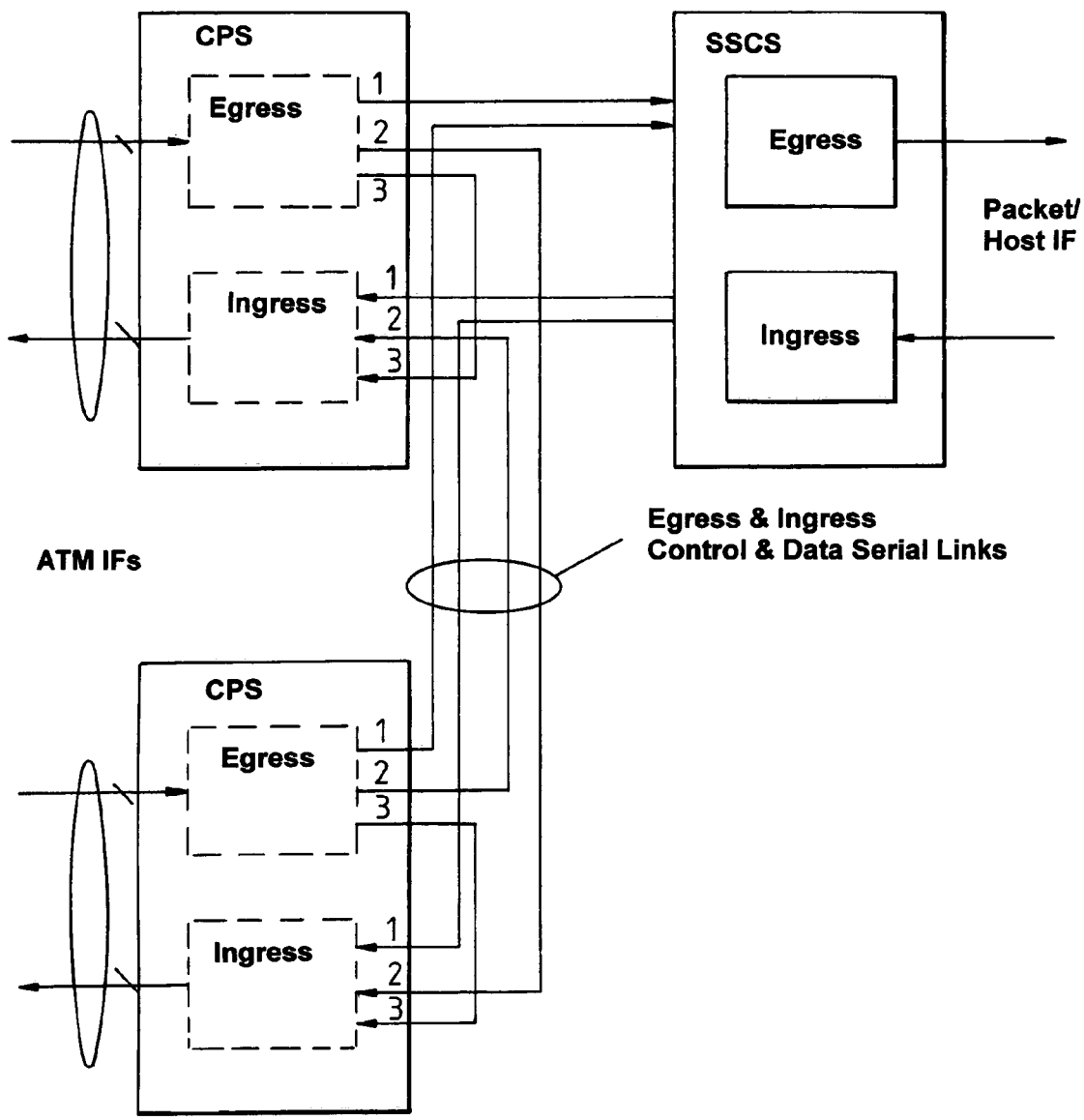
FIG. 9 shows an example of use of CPS and SSCS Data Devices for AAL-2 switching.

FIG. 9 illustrates an example of how an AAL-2 switching function can be constructed without using the SSCS Voice device as it is not needed for voice transcoding. The SSCS Data device is needed in the switching application to support the AAL-2 connection management messaging and any OAM/MIB functions to ensure the connection integrity can be monitored. Again, the host interfaces are omitted in the interests of clarity.

Although the CPS described interfaces with an ATM layer device as illustrated in the previous figures, there are fundamentally no restrictions on what standard Transport Media such as SONET/SDH, Frame-Relay, T*/E* or MPEG-TS can be used for the network interface. This provides maximum system architecture flexibility in that only the appropriate Physical/ATM Layer Function may need to be customised for the specific network needs.

It will be understood that the above description of a preferred embodiment is given by way of example only and that various modifications may be made by those skilled in the art without departing from the spirit and scope of the invention.

The invention claimed:

1. A common part sublayer (CPS) ATM adaptation device, for interfacing between a narrow band network and a broad band network said device being functionally partitioned to provide scheduling, prioritization and multiplexing of ingress traffic to the broadband network independently of the adaptation layer (AAL) type of that traffic, and incorporating ingress and egress paths respectively to and from the broadband network, wherein said egress path provides on a through path segregation and delineation of incoming data units on to respective external data ports, and wherein said ingress path incorporates a common memory for payload storage whereby to perform multiplexing at both ML and ATM layers.

2. A common part sublayer ATM adaptation device as claimed in claim 1, and arranged to schedule a dispatch of cells or packets into an asynchronous network at a substantially constant rate.

3. A common part sublayer ATM adaptation device as claimed in claim 2, wherein said segregation on to external data ports is determined from a combination of connection identifier, call state and packet type.

4. A common part sublayer ATM adaptation device as claimed in claim 3, wherein said multiplexing is controlled by a scheduling and congestion avoidance mechanism.

5. A common part sublayer ATM adaptation device as claimed in claim 4, wherein said payload memory provides for the storage of AAL2 mini-packet SDUs and/or ATM cell SDUs.

6. A common part sublayer ATM adaptation device as claimed in claim 5, and arranged to provide an AAL2 and ATM switching function.

7. A common part sublayer ATM adaptation device as claimed in claim 5, and incorporating a service specific convergence sublayer so as to provide ATM and IP trunking and interworking functions.

8. A common part sublayer ATM adaptation device as claimed in claim 5, and having a shared memory for data in the ingress direction so as to provide buffer storage for said ingress data.

9. A common part sublayer ATM adaptation device as claimed in claim 8, and incorporating an ingress dynamic buffer whereby to provide quality of service (QoS) control.

10. A method of interfacing a narrow band network and a broadband network via a common part sublayer (CPS) ATM adaptation device, the method comprising; in an ingress direction towards the broadband network, providing scheduling, prioritization and multiplexing of ingress traffic to the broadband network independently of the adaptation layer (AAL) type of that traffic, and, in an egress direction from the broadband network, providing on a through path segregation and delineation of incoming data units.

11. A method as claimed in claim 10, wherein said segregation on to external data ports is determined from a combination of connection identifier, call state and packet type.

12. A method as claimed in claim 11, wherein said multiplexing is controlled by a scheduling and congestion avoidance mechanism.

13. A communications network arrangement, comprising a narrow band network, a broadband network, and a common part sublayer (CPS) ATM adaptation device providing an interfacing function therebetween, wherein common part sublayer ATM adaptation device is functionally partitioned to provide scheduling, prioritization and multiplexing of ingress traffic to the broadband network independently of the adaptation layer (AAL) type of that traffic, and incorporates ingress and egress paths respectively to and from the broadband network, wherein said egress path provides on a through path segregation and delineation of incoming data units on to respective external data ports, and wherein said ingress path incorporates a common memory for payload storage whereby to perform multiplexing at both AAL and ATM layers.

14. Software in machine readable form for operating a common part sublayer (CPS) ATM adaptation device, for interfacing between a narrow band network and a broad band network, said software being adapted to functionally partition the device so as to provide scheduling, prioritization and multiplexing of ingress traffic to the broadband network independently of the adaptation layer (AAL) type of that traffic to provide scheduling, prioritization and multiplexing of ingress traffic to the broadband network independently of the adaptation layer (AAL) type of that traffic, and incorporating ingress and egress paths respectively to and from the broadband network, wherein said egress path provides on a through path segregation and delineation of incoming data units on to respective external data ports, and wherein said ingress path incorporates a common memory for payload storage whereby to perform multiplexing at both ML and ATM layers.

* * * * *